May 3, 1927.
T. THORSTEN
1,627,354
CONVEYER
Filed April 11, 1924    3 Sheets-Sheet 1
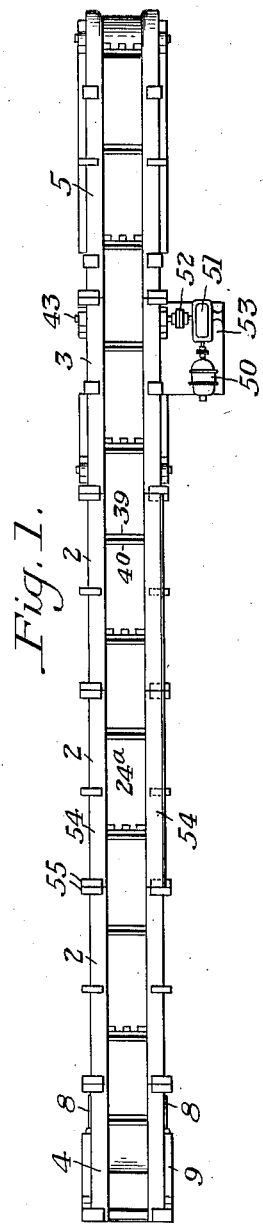
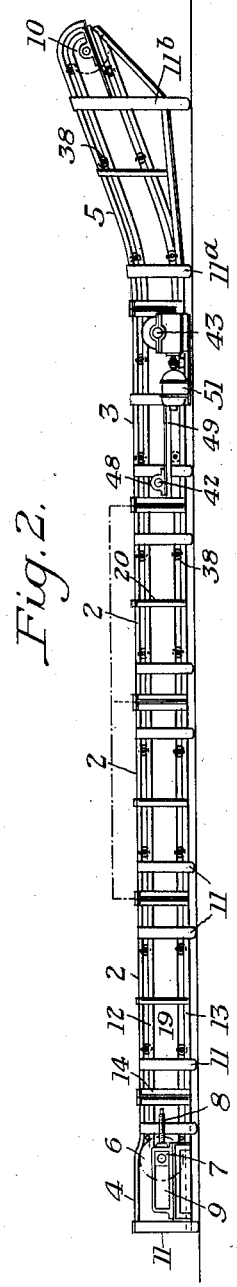
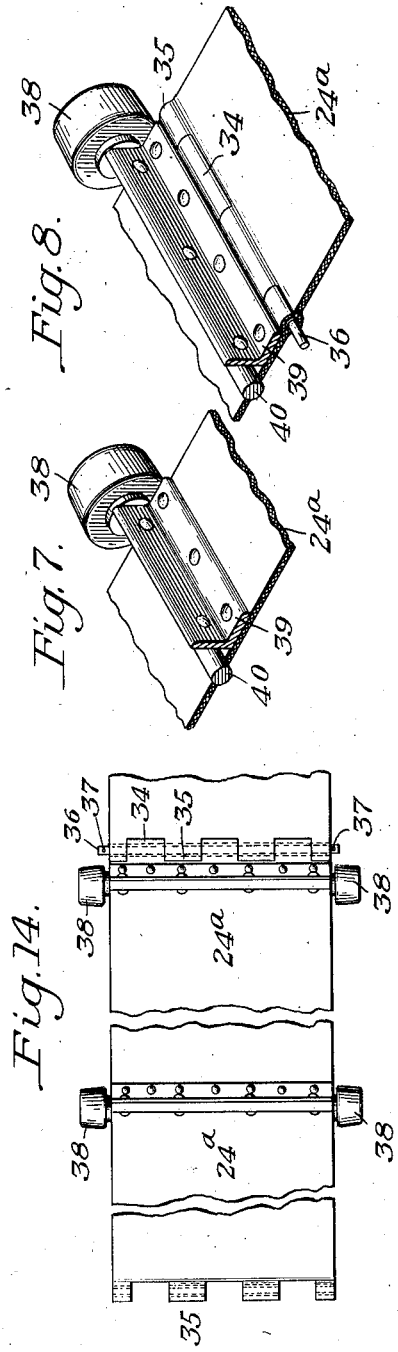
INVENTOR May 3, 1927.

T. THORSTEN 1,627,354

CONVEYER

Filed April 11, 1924 3 Sheets-Sheet 2

INVENTOR

May 3, 1927.
T. THORSTEN
CONVEYER
Filed April 11, 1924   3 Sheets-Sheet 3
1,627,354
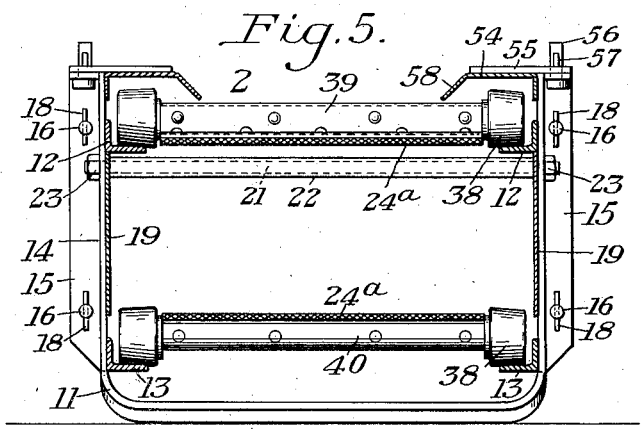
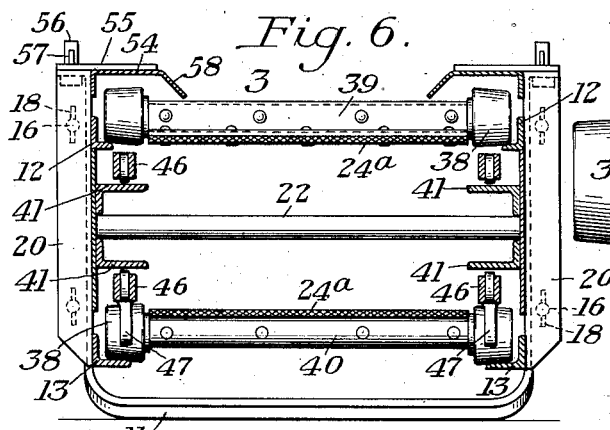
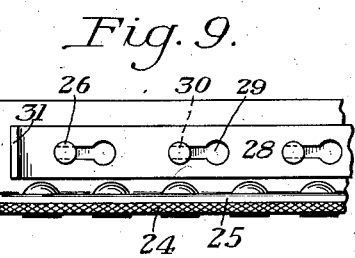
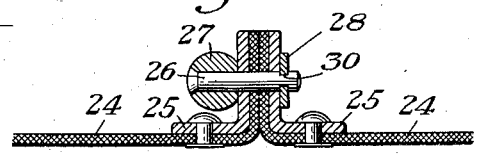
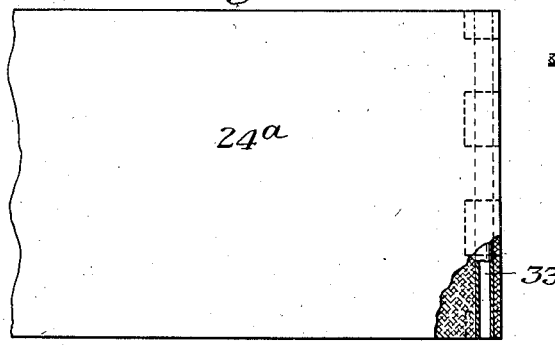
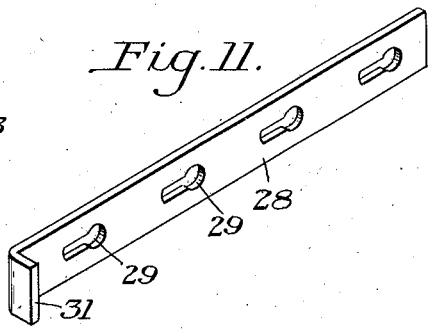
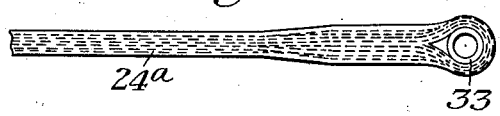

Patented May 3, 1927.

1,627,354

UNITED STATES PATENT OFFICE.

THORLEIF THORSTEN, OF PITTSBURGH, PENNSYLVANIA.

CONVEYER.

Application filed April 11, 1924. Serial No. 705,753.

The present invention relates broadly to conveyers, and more particularly to endless belt conveyers.

The usual practice is to support an endless belt conveyer upon rollers which are mounted in fixed position in the supporting structure. This type of conveyer is complicated, heavy and expensive to construct, and is usually limited to permanent installations and cannot readily be reinstalled in and adapted to another location for which it was not originally designed. By the present invention I have provided a conveyer in which the endless carrier is provided with rollers adjacent its edges which travel on tracks associated with the supporting structure. The endless carrier may be constructed as a unit, but is preferably made in sections detachably connected together. Another feature of the invention resides in the method of constructing the sections and in the provision of novel means for connecting them together. A further feature of the invention resides in the provision of a supporting structure made in sections, preferably corresponding in length to the length of the sections of the endless carrier and adapted to be detachably connected together. Still another feature of the invention resides in incorporating in the supporting structure a drive unit having means for engaging the rollers on the endless carrier for propelling the latter.

The above and other features of the invention will be more readily apparent by referring to the accompanying drawings and the following description.

In the drawings:—

Figure 1 is a plan view of a conveyer embodying the invention,

Figure 2 is a side elevation thereof,

Figure 3 is a view in elevation and on a larger scale of a portion of the conveyer, Figure 4 is a view in elevation and on a larger scale of the drive unit, Figure 5 is a section on the line V—V of Figure 3, Figure 6 is a section on the line VI—VI of Figure 4, Figures 7 and 8 are detail views illustrating the manner of mounting the journals for the rollers on the endless belt, Figures 9, 10 and 11 are detail views illustrating one way of connecting the belt sections at their ends, Figures 12 and 13 are, respectively, a plan view and an edge view of a portion of a belt section illustrating a step in the manufacture thereof to provide a different form of connecting means, and Figure 14 is a plan view of a portion of the belt having the form of connecting means shown in Figures 12 and 13.

In the illustrated embodiment of the invention the supporting structure is made in sections and comprises any suitable number of intermediate sections 2, a special drive section 3, and end sections 4 and 5. The end section 4 has a roller 6 mounted therein having bearing blocks 7 adjustable by means of screws 8 in horizontal windows 9 in the sides of the section for varying the position of the roller in order to properly tension the endless carrier to be hereinafter described. The other end section 5 may incline upwardly, as shown, in order to carry the material being conveyed to any desired elevation. This section has a roller 10 mounted therein for cooperation with the roller 6 for supporting the endless carrier at its ends.

Each section of the supporting structure comprises spaced U-shaped members 11, the bottoms of which engage the floor or other support, and the upstanding legs of which have the longitudinally extending elements constituting the sides of the section riveted thereto. Each section has a pair of vertically spaced angles 12 and 13 at each side thereof, the vertical flanges of the angles being riveted to the legs of the U-shaped members 11 and the horizontal flange thereof constituting tracks. Vertically extending angles 14 are riveted to the ends of the longitudinally extending angles 12 and 13, with one flange 15 of each angle 14 extending outwardly from the side of the section. When the sections of the supporting structure are alined end to end, these outstanding flanges 15 abut each other and the sections are adapted to be detachably fastened together by means of headed pins 16 inserted in registering openings 17 in the flanges 15 and held in place by wedges 18 inserted in openings in the shanks of the pins.

Each side of each section may also embody a longitudinally extending plate 19 positioned between the upper and lower angles 12 and 13 and riveted to the U-shaped members 11 and angles 14. An additional vertical angle 20 may be associated with each side of each section intermediate the U-shaped members 11 and riveted to the angles 12 and 13 and intermediate plate 19. For holding the sides of each section in correct vertical position and preventing them from springing either outwardly or inwardly bolts 21 extend transversely of each section and have their screw-threaded ends positioned in openings in the U-shaped members 11. A sleeve 22 is mounted on each bolt between the sides of the section and nuts 23 are mounted on the screw-threaded ends of the bolts on the exterior of the sides of the section. The structure above described is that of each intermediate section 2 of the conveyer. Of course, it will be apparent that the end sections 4 and 5 are of slightly modified construction, the end section 5 having U-shaped members 11ª and 11ᵇ of different lengths in order to give the end section the desired inclination. Instead of the parts being riveted together they may be bolted or otherwise fastened.

The endless belt is preferably made in sections of a length corresponding to the length of the intermediate sections 2 of the supporting structure, the belt sections being connected together at their ends. In Figures 9, 10 and 11 I have illustrated one way of connecting the belt sections 24. An angle 25 is associated with each end of each section and has one flange thereof riveted to such end. Two sections equipped with such angles may be joined end to end by passing bolts 26 through alined openings in the other flanges of said angles. It will be noted, by reference to Figure 10, that the end portions of the sections are interposed between the upstanding flanges of the angles 25. The bolts 26 extend through a bar 27 which abuts against the outer side of one of the upstanding flanges and has rollers 38 journaled on its ends, and the plate 28, shown in Figure 11, is adapted to engage the ends of the bolts and lock the ends of the sections together. For this purpose the plate 28 is provided with keyhole slots 29 through the enlarged portions of which the ends of the bolts 26 are adapted to pass. The bolts are provided with slots 30 so that when the ends of the bolts are passed through the enlarged portions of the keyhole slots and the plate 28 shifted longitudinally the edges of the narrow portions of the keyhole slots will engage in the grooves 30. The plate 28 is provided at one end thereof with a portion 31 extending at an angle thereto to provide a finger piece for operating the plate.

Figures 12, 13 and 14 illustrate another convenient way of connecting the belt sections together. In manufacturing the belt section 24ª a tubular member 33 may be incorporated in each end thereof, preferably by extending the longitudinal fibers of the belt material around the member so as to properly incorporate it in the belt structure. After the section has been constructed, as shown in Figures 12 and 13, one end of each section may be cut out along the dotted lines shown in Figure 12 to provide the hinge portion 34 shown in Figure 14, and the other end of the section may be similarly notched out to provide the hinge portion 35, the portions 34 and 35 being staggered in order that the ends of adjacent sections may be joined in the manner shown. A rod 36 may be passed through the interengaging projections 34 and 35 to complete the hinge connection, said rod having cotter pins 37 inserted in its opposite ends in order to hold the rod in place.

In the form of connection shown in Figures 9, 10 and 11 the sections can be quickly disconnected by shifting the plates 28 so as to permit the removal of the bolts 26. In like manner, in the form of connection shown in Figures 12, 13 and 14, the sections can be readily disconnected by withdrawing the cotter pins 37 from one end of rods 36 and then removing such rods.

The endless carrier, whether constructed as a single unit or constructed in sections, is provided adjacent its edges with rollers 38 adapted to travel on the tracks 12 and 13. These rollers can be mounted on the bars 27, as illustrated in Figures 9, 10 and 11. Another way of mounting the rollers is shown in Figures 7 and 8. Referring to these figures, angles 39 extend transversely across the belt and have their horizontal flanges riveted thereto. A rod or bar 40 extends across the belt in engagement with the vertical flange of each angle 39 and is riveted thereto. Each rod or bar 40 has journals at its opposite ends projecting beyond the edges of the belt, the rollers 38 being mounted upon such journals. The rollers 38 are preferably tapered for the reason that tapered rollers engaging the tracks 12 and 13, as illustrated in Figure 5, will tend to center the belt when the same is loaded. The ends of the rollers 38 are adapted to engage the vertical flanges of the tracks 12 and 13 to limit lateral movement of the belt in case the load thereon tends to shift the same laterally.

Referring to Figures 4 and 6, the section 3 of the supporting structure is similar in construction to the sections 2 but has, in addition to the upper and lower tracks 12 and 13, intermediate tracks 41. Journaled in the opposite ends of the section 3 are transversely extending shafts 42 and 43, each shaft having a pair of sprocket wheels 44 mounted thereon. Engaging the sprocket wheels 44 is a pair of sprocket chains 46, each sprocket chain being arranged to engage the tracks 41 at the corresponding side of the section 3 and having lugs 47 for engagement with the rollers 38 of the belt conveyer. The bearings 48 for the shaft 42 are mounted upon longitudinally extending angles 49 riveted to the sides of the section. The shaft 43 is driven by a motor 50 through suitable gearing 51 and a clutch 52, all of these parts being mounted upon a support 53 secured to and projecting laterally from one side of the section.

It will be apparent that the angles 39 will maintain the belt substantially flat and that the amount of loose material which can be loaded upon the belt will be limited by the angle of repose of such material. To increase the capacity of the conveyer, I provide on the supporting structure vane plates 54 which extend longitudinally of the structure and are detachably secured to the sides thereof adjacent the upper edges of such sides. Preferably, these vane plates are made in sections corresponding in length to the length of the sections of the supporting structure. By reference to Figures 5 and 6 it will be seen that the vane plates are secured in position by means of bars 55 fastened to the plates and detachably secured to the sides of the sections by bolts 56 and co-operating wedges 57. These vanes extend inwardly over the rollers 38 and edge portions of the conveyer and have downwardly deflected inner edge portions 58 which are adapted to limit the spread of the material placed on the conveyer and, at the same time, allow the material to be centered on the belt and moved at uniform speed with the belt adjacent to the vane plates. These vane plates, in addition to limiting the spread of the material on the belt, act as protecting plates for the moving parts of the upper run of the conveyer. In preventing material from being dumped onto the moving parts when the conveyer is operating, these vane plates also safeguard workmen and others against injury by accidental contact with such moving parts. The plates 19 forming parts of the sides of the sections of the supporting structure enclose and protect the moving parts at the lower run of the conveyer. If desired, a vertical baffle wall, indicated in dotted lines in Figure 2, can be placed at one side of the supporting structure to prevent overthrow of material being loaded onto the conveyer from the opposite side of the supporting structure.

Mention has already been made that the sections 2 and 3 of the supporting structure will preferably be made of uniform length and that the belt sections will be made of a corresponding length. It will readily be seen that this will facilitate the assembly or disassembly of the parts of the conveyer.

The end sections 4 and 5 will preferably be made of such length and have the rollers 6 and 10 associated therewith in such manner that the distance from the abutting end of each section around its associated roller and back to such abutting end will be approximately equal to the length of one belt section or to the length of a plurality of such sections.

The advantages of the invention will be readily apparent to those skilled in the art. By the provision of rollers on the endless carrier for engagement with fixed tracks on the supporting structure, I am enabled to eliminate the costly and bulky structure heretofore employed, in which the conveyer is supported on rollers carried by the supporting structure. By making the supporting structure in sections, these sections can be constructed at a central plant and shipped to the point of erection and there quickly assembled. Moreover, conveyers of any suitable length may be constructed by utilizing the required number of sections. Constructing the endless belt in sections enables an endless conveyer to be quickly put together to correspond in length to the length of the supporting structure, irrespective of the number of sections of the latter. The use of conical rollers carried by the belt for engaging the fixed tracks of the supporting structure results in the belt being automatically centered at all times with relation to the supporting structure.

While I have shown and described a preferred embodiment of the invention it will be understood that changes may be made in the details of construction without departing from the spirit of the invention or scope of the appended claims.

I claim:

1. A conveyer, comprising a supporting structure having rollers mounted therein adjacent the ends thereof and having a track at each side extending longitudinally thereof between said rollers, a continuous endless belt of flexible material engaging said rollers, anti-friction means carried by said belt adjacent the edges thereof for engaging said tracks to support the upper stretch of said belt, the edges of said belt being otherwise free and unobstructed, and reinforcing means extending transversely of said belt at intervals and located wholly on the outer surface thereof, substantially as described.

2. A conveyer, comprising a supporting structure having rollers mounted therein adjacent the ends thereof and having a track at each side extending longitudinally thereof between said rollers, a continuous endless belt of flexible material engaging said rollers, tapered rollers carried by said belt adjacent the edges thereof for engagement with said tracks, said rollers being arranged with their smaller ends farthest from the edges of the belt, the edges of said belt being otherwise unobstructed, and journals for said rollers secured to said belt, substantially as described.

3. A conveyer, comprising a supporting structure having rollers mounted therein adjacent the ends thereof and having a track at each side extending longitudinally thereof between said rollers, a continuous endless belt of flexible material engaging said rollers, bars extending transversely of said belt and secured on the outer surface thereof and having journals at their ends projecting beyond the edges of the belt, and rollers mounted on said journals for engagement with said tracks, the edges of said belt being otherwise unobstructed, substantially as described.

4. A conveyer, comprising a supporting structure having rollers mounted therein adjacent the ends thereof and having a track at each side extending longitudinally thereof between said rollers, an endless belt engaging said rollers, angles extending transversely of said belt on its outer surface and each having one flange fastened thereto, a bar secured to the other flange of each angle and having journals at its ends projecting beyond the edges of the belt, and rollers mounted on said journals for engagement with said tracks, substantially as described.

5. A conveyer, comprising a supporting structure having rollers mounted therein adjacent the ends thereof and having a track at each side extending longitudinally thereof between said rollers, a continuous endless belt of flexible material engaging said rollers and formed in sections, means detachably connecting the sections together at their ends, and anti-friction means carried by said belt adjacent the edges thereof for engaging said tracks, the edges of said belt being otherwise unobstructed, substantially as described.

6. A conveyer, comprising a supporting structure having rollers mounted therein adjacent the ends thereof and having a track at each side extending longitudinally thereof between said rollers, an endless belt of flexible material engaging said rollers and formed in sections, rollers carried by said belt adjacent the edges thereof for engaging said tracks, and means for detachably connecting said sections at their ends, comprising a member extending transversely of the belt at each joint and movable longitudinally to disconnect the sections at such joint, substantially as described.

7. A conveyer, comprising a supporting structure having rollers mounted therein adjacent the ends thereof and having a track at each side extending longitudinally thereof between said rollers, an endless fabric belt engaging said rollers and formed in sections, rollers carried by said belt adjacent the edges thereof for engaging said tracks, and means for detachably connecting said sections at their ends, comprising interfitting metallic tubular elements at adjacent ends of the sections incorporated in the belt structure, and a rod extending through such interfitting elements at each joint and withdrawable therefrom to disconnect the sections at such joint, substantially as described.

8. A conveyer, comprising a supporting structure made in sections detachably connected end to end, a roller journaled in each end section, the intermediate sections being of substantially uniform length, a track at each side of said supporting structure extending longitudinally thereof between said rollers, a continuous endless belt of flexible material engaging said rollers and made in sections corresponding in length substantially to the length of the intermediate sections of said supporting structure, rollers carried by said belt adjacent the edges thereof for engagement with said tracks, the edges of said belt being otherwise unobstructed, and means detachably connecting the adjacent ends of the belt sections, substantially as described.

9. A conveyer, comprising a supporting structure made in sections detachably connected end to end, all of said sections except the end sections being of the same length, a roller journaled in each end section, a track at each side of said supporting structure extending longitudinally thereof between said rollers, an endless belt of flexible material engaging said rollers and made in sections corresponding in length to the length of the intermediate sections of the supporting structure, rollers carried by said belt adjacent the edges thereof for engagement with said tracks, and means detachably connecting the adjacent ends of the belt sections, the distance from the abutting end of each end section around its associated roller and back to such abutting end being approximately equal to the length of one belt section or to the length of a plurality of such sections, substantially as described.

10. A conveyer, comprising a supporting structure made in sections detachably connected end to end, a roller journaled in each end section, an endless belt of flexible material engaging said rollers, each intermediate section having a track member mounted upon each side thereof, said track members at each side of the structure being in alignment, rollers carried by said belt adjacent the edges thereof for engagement with said track members, means associated with one of said sections for propelling said belt, said means comprising a pair of spaced sprocket chains each having lugs for engaging the rollers carried by said belt, and tracks at the opposite sides of said section engaged by said chains, substantially as described.

11. A continuous endless belt conveyer of flexible material having bars extending transversely thereof and secured on the outer surface thereof, said bars having journals at their ends located adjacent the edges of the belt, and rollers mounted upon said journals, the edges of said belt being otherwise unobstructed, substantially as described.

12. A continuous endless belt conveyer of flexible material having reinforcing bars extending transversely thereof at intervals and arranged on the outer surface thereof, and rollers carried by said belt adjacent the edges thereof, the edges of said belt being otherwise unobstructed, substantially as described.

13. An endless fabric belt conveyer adapted to pass around cylindrical supporting rollers, said belt having track-engaging means at its edges and being formed in sections, and means connecting said sections at their ends, comprising interfitting tubular elements at the adjacent ends of the sections incorporated in the belt structure, and a pintle extending through such interfitting elements at each joint, substantially as described.

In testimony whereof I have hereunto set my hand.

THORLEIF THORSTEN.